(12) United States Patent
Abramovich et al.

(10) Patent No.: US 7,830,071 B2
(45) Date of Patent: Nov. 9, 2010

(54) POWER HARVESTING APPARATUS, SYSTEM AND METHOD

(75) Inventors: Haim Abramovich, Nesher (IL); Eugeny Harash, Haifa (IL); Charles Milgrom, Moshav Aminadav (IL); Uri Amit, Raanana (IL); Lucy Edery Azulay, Haifa (IL)

(73) Assignee: Innowattech Ltd., Haifa (IL)

( * ) Notice: Subject to any disclaimer, the term of this patent is extended or adjusted under 35 U.S.C. 154(b) by 0 days.

(21) Appl. No.: 12/204,958

(22) Filed: Sep. 5, 2008

(65) Prior Publication Data

US 2009/0195226 A1    Aug. 6, 2009

Related U.S. Application Data

(60) Provisional application No. 61/026,600, filed on Feb. 6, 2008.

(51) Int. Cl.
*H01L 41/113*    (2006.01)
(52) U.S. Cl. .................................................. 310/339
(58) Field of Classification Search ................. 310/339
See application file for complete search history.

(56) References Cited

U.S. PATENT DOCUMENTS

| | | | | |
|---|---|---|---|---|
| 3,105,952 A | * | 10/1963 | Kidder | 340/940 |
| 3,616,682 A | * | 11/1971 | Golis et al. | 73/641 |
| 4,404,490 A | * | 9/1983 | Taylor et al. | 310/339 |
| 4,712,423 A | * | 12/1987 | Siffert et al. | 73/146 |
| 4,799,381 A | * | 1/1989 | Tromp | 73/146 |
| 5,340,510 A | * | 8/1994 | Bowen | 264/434 |
| 5,376,859 A | * | 12/1994 | Kim et al. | 310/334 |
| 5,461,924 A | * | 10/1995 | Calderara et al. | 73/786 |
| 5,520,056 A | * | 5/1996 | Buisson et al. | 73/784 |
| 6,806,622 B1 | * | 10/2004 | Schmidt et al. | 310/334 |
| 2002/0063495 A1 | * | 5/2002 | Brenner et al. | 310/311 |
| 2003/0051561 A1 | * | 3/2003 | Weiss | 73/862.046 |
| 2005/0127677 A1 | * | 6/2005 | Luttrull | 290/1 R |
| 2005/0258717 A1 | * | 11/2005 | Mullen | 310/339 |
| 2008/0083139 A1 | * | 4/2008 | Mullen | 36/136 |
| 2009/0195122 A1 | * | 8/2009 | Abramovich et al. | 310/319 |
| 2009/0195124 A1 | * | 8/2009 | Abramovich et al. | 310/339 |

FOREIGN PATENT DOCUMENTS

| | | | |
|---|---|---|---|
| CH | EP-0 491 655 A | * | 6/1992 |
| CN | 1633008-(A) | * | 6/2005 |
| JP | 06-141478 | * | 5/1994 |
| JP | 2002-063685 | * | 2/2002 |
| WO | WO/2006/053479 | * | 5/2006 |
| WO | WO/2008/127823 | * | 10/2008 |

* cited by examiner

*Primary Examiner*—Thomas M Dougherty
(74) *Attorney, Agent, or Firm*—William H. Dippert; Eckert Seamans Cherin & Mellott, LLC

(57) ABSTRACT

The present invention relates to an apparatus system and method for power harvesting on roads and highways using piezoelectric generator. The invention is to provide a system and a method for power harvesting comprising a plurality of piezoelectric devices embedded in a road and configured to produce electrical power when a vehicle traverses their locations. The system includes a power conditioning unit and electrical conductors connecting said piezoelectric to said power conditioning unit. Harvested energy may be used locally in proximity to the energy generation location, stored for later use or transferred to be used in remote location.

19 Claims, 18 Drawing Sheets

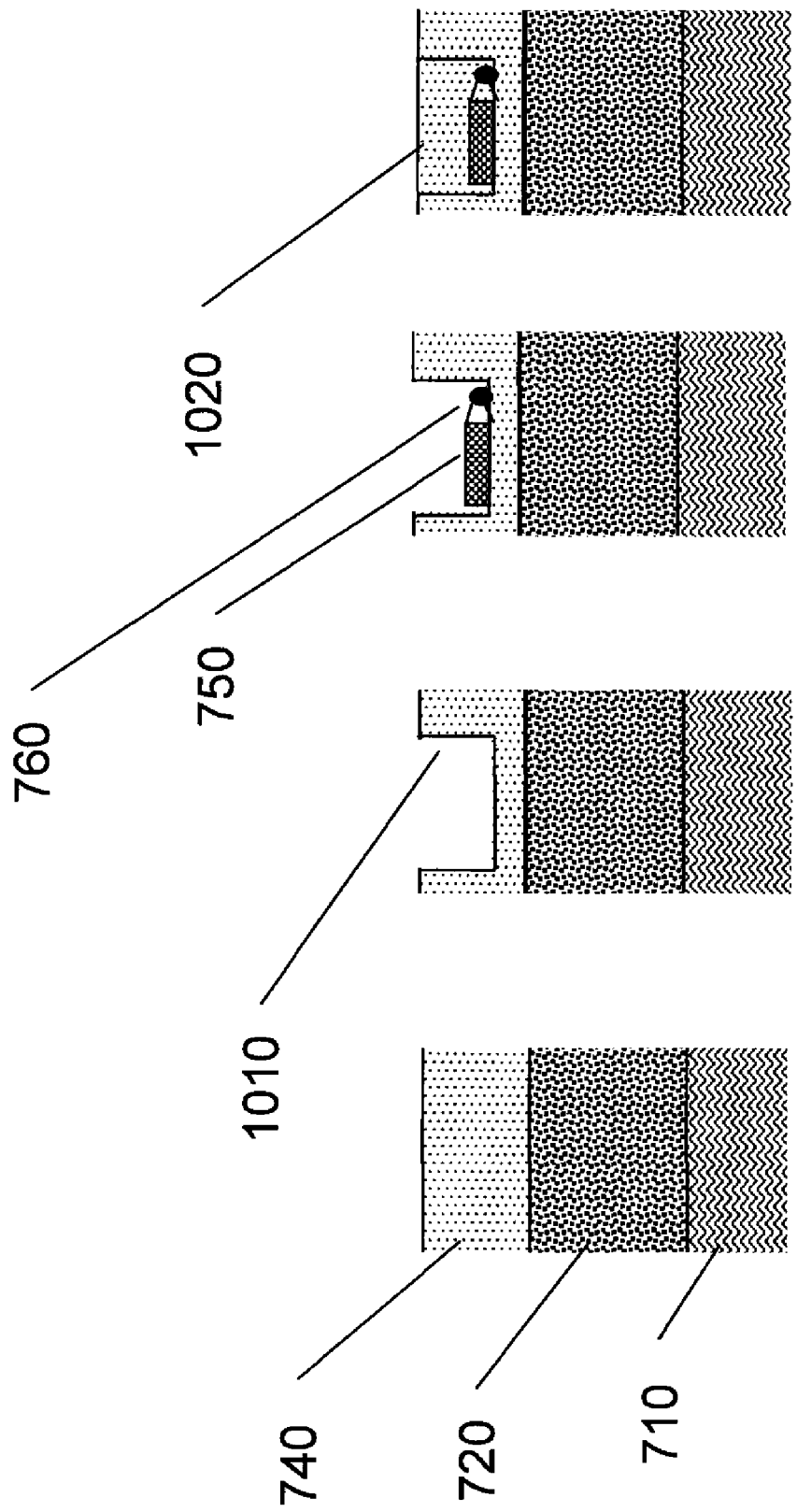

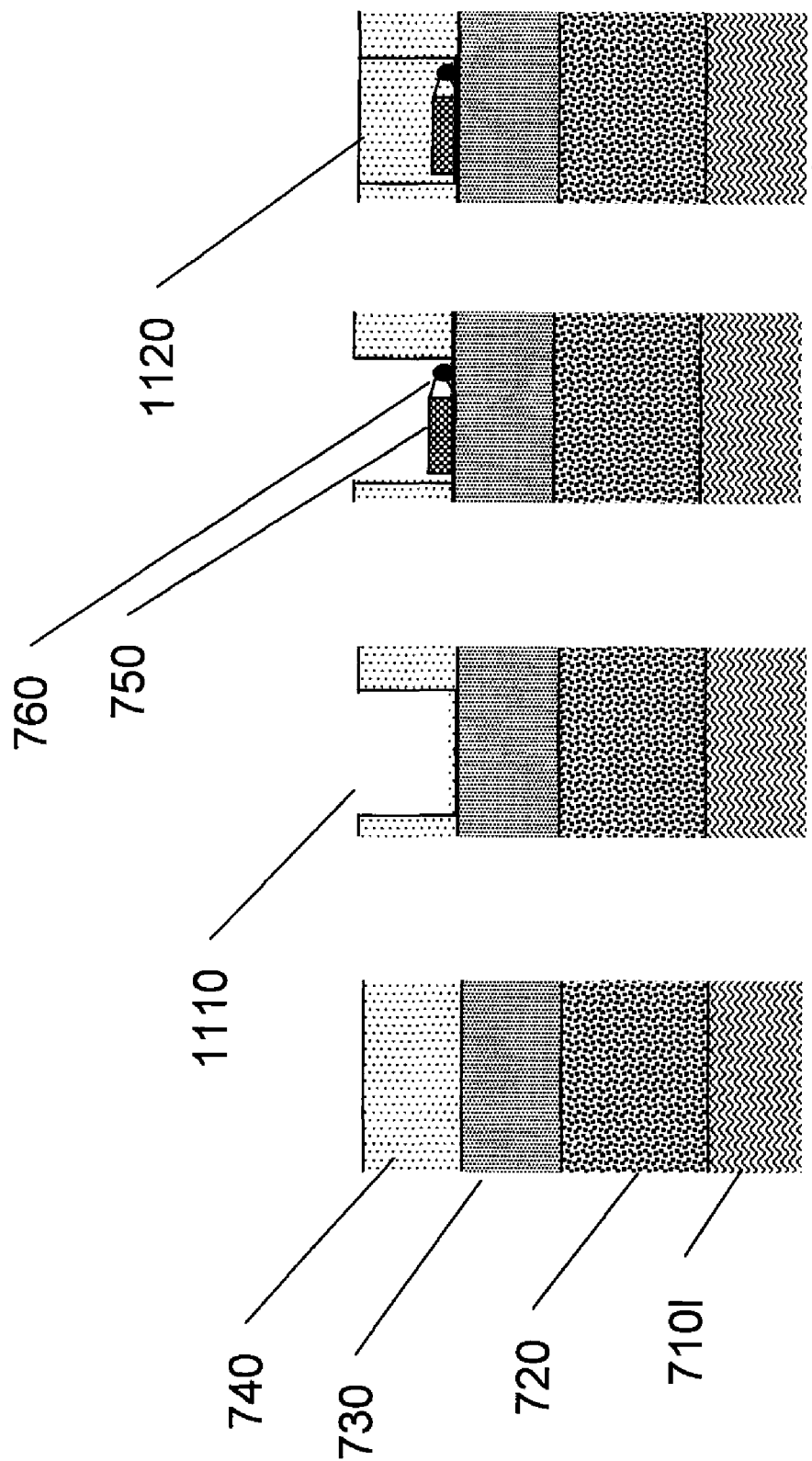

POWER HARVESTING APPARATUS, SYSTEM AND METHOD

The present invention claims priority from U.S. provisional patent application Ser. No. 61/026,600 filed on 06, Feb. 2008 by Abramovich et al.

FIELD OF THE INVENTION

The present invention relates to an apparatus system and method for power harvesting on roads, highway, railways and airport runaways using piezoelectric generators.

BACKGROUND OF THE INVENTION

Piezoelectricity is the ability of certain crystalline materials to develop an electrical charge proportional to an applied mechanical stress. The converse effect can also be seen in these materials where strain is developed proportional to an applied electrical field. It was originally discovered by the Curie's in the 1880's. Today, piezoelectric materials for industrial applications are lead based ceramics available in a wide range of properties. Piezoelectric materials are the most well known active material typically used for transducers as well as in adaptive structures.

Virgin ceramic materials must be first poled to utilize their complete piezoelectric effect. Poling consists of applying a high electrical field to the material. During the poling process the crystal dipoles in the material are aligned with the applied electrical field and the material expands in the direction of the electrical field. By applying a field in the opposite direction, strain of opposite sign is observed. If the magnitude of this opposite field is increased, the material first depoles and finally repoles.

Poled piezoelectric material is considered transversely isotropic, i.e.: one plane is isotropic while the out-of-plane direction has different properties. The standard coordinate convention adopted by the IEEE [IEEE Standard on Piezoelectricity, 176-1978] assigns the 1-2 plane as the plane of symmetry and the 3-direction as the-out of-plane poling direction. For a small applied electrical field, the response of the piezoelectric ceramic can be modeled by the following linear piezoelectric constitutive [Jaffe, B., Cook Jr., W. R., and H. Jaffe, 1971, "Piezoelectric Ceramics", Academic Press] expressed in engineering matrix notation as:

$$\begin{Bmatrix} S \\ D \end{Bmatrix} = \begin{bmatrix} s^E & (d)^T \\ d & \varepsilon^T \end{bmatrix} \begin{Bmatrix} T \\ E \end{Bmatrix} \tag{1}$$

where D—electrical displacement, S—strain, E—electric field, T—stress, $\varepsilon^T$—constant stress (unclamped) dielectric, d—induced strain constant, $s^E$—constant field compliance.

Mechanical compression or tension on a poled piezoelectric ceramic element changes the dipole moment, creating a voltage. Compression along the direction of polarization, or tension perpendicular to the direction of polarization, generates voltage of the same polarity as the poling voltage. Tension along the direction of polarization, or compression perpendicular to the direction of polarization, generates a voltage with polarity opposite that of the poling voltage. These actions are generator actions—the ceramic element converts the mechanical energy of compression or tension into electrical energy. This behavior is used in fuel-igniting devices, solid state batteries, force-sensing devices, and other products. Values for compressive stress and the voltage (or field strength) generated by applying stress to a piezoelectric ceramic element are linearly proportional up to a material-specific stress. The same is true for applied voltage and generated strain.

If a voltage of the same polarity as the poling voltage is applied to a ceramic element, in the direction of the poling voltage, the element will lengthen and its diameter will become smaller. If a voltage of polarity opposite that of the poling voltage is applied, the element will become shorter and broader. If an alternating voltage is applied, the element will lengthen and shorten cyclically, at the frequency of the applied voltage. This is motor action—electrical energy is converted into mechanical energy. The principle is adapted to piezoelectric motors, sound or ultrasound generating devices, and many other products.

FIG. 1a. Schematically depicts the generator action of a piezoelectric element as known in the art.

The piezoelectric material has a considerable impact on the achievable performance of the transducer. Commonly used piezoelectric materials are based on lead zirconate titanate (PZT) ceramics.

Assuming that a PZT element is directly used as a transducer, the significant material parameters can be outlined to provide the material figure of merit. There are many factors that influence the selection of the PZT composition. The constitutive equations for a linear piezoelectric material under low stress (T) levels can be written as $$x = s^D T + gD \tag{2}$$

And $$E = -gT + \beta^X D \tag{3}$$

where x is the strain, D is the electric displacement, E is the electric field, s is the elastic compliance, and g is the piezoelectric voltage coefficient given as $$g = \frac{d}{\varepsilon_0 \varepsilon^X} \tag{4}$$

Here, d is the piezoelectric constant and $\in$ is the dielectric constant. The constant $\beta$ in eq. (3) is the dielectric susceptibility, and is equal to the inverse dielectric permittivity tensor component. Under an applied force F=T·A, (where A is the area), the open circuit output voltage (U) of the ceramic can be computed from eq. (3), and is given as $$U = Et = -gTt = -\frac{gFt}{A} \tag{5}$$

where t is the thickness of the ceramic. The charge (Q) generated on the piezoelectric ceramic can be determined from eq. (2) and is given as $$D = \frac{Q}{A} = \frac{E}{\beta^X} = \frac{U \varepsilon_0 \varepsilon^X}{t} \tag{6}$$

or $$Q/U = \frac{\varepsilon^X \varepsilon_0 A}{t} = C \tag{7}$$

where C is the capacitance of the material. The above relationship shows that at low frequencies a piezoelectric plate can be assumed to behave like a parallel plate capacitor. Hence, the electric power available under the cyclic excitation is given by ea. (8) as follows $$P = \frac{1}{2}\frac{d^2}{\varepsilon_0 \varepsilon^x} F^2 \frac{1}{A} fP = \frac{1}{2}CV^2 f = \frac{1}{2}(\mathrm{dg})T^2 Vf \qquad (8)$$

where V=A×t is volume of the piezoelectric generator

Under certain experimental conditions, for a given material of fixed area and thickness, the electrical power is dependent on the d2/∈X ratio of the material.

A material with a high d2/∈X ratio will generate high power when the piezoelectric ceramic is directly employed for harvesting energy.

FIG. 1b(i) depicts the construction of a single element transducer and FIG. 1b(ii) depicts a multi-layered transducer.

In a multilayered construction of FIG. 1b(ii), the same force F is applied to all the layers. However, due to the smaller thickness of each layer, the voltage developed in each of the layer, (which is the voltage developed on the entire structure, as the layers are electrically connected in parallel) is lower. Electrically connecting all the layer in parallel increases the capacitance of the structure.

FIG. 1b(iii) depicts a preferred embodiment of a multilayer PZT generator wherein the polling directions of consecutive layers are reversed. In this embodiment, a common electrode is used between two, oppositely oriented layers.

The review article "Advances In Energy Harvesting Using Low Profile Piezoelectric Transducers"; by Shashank Priya; published in J Electroceram (2007) 19:165-182; provides a comprehensive coverage of the recent developments in the area of piezoelectric energy harvesting using low profile transducers and provides the results for various energy harvesting prototype devices. A brief discussion is also presented on the selection of the piezoelectric materials for on and off resonance applications.

The paper "On Low-Frequency Electric Power Generation With PZT Ceramics"; by Stephen R. Platt, Shane Farritor, and Hani Haider; published in IEEE/ASME Transactions On Mechatronics, VOL. 10, NO. 2, April 2005; discusses the potential application of PZT based generators for some remote applications such as in vivo sensors, embedded MEMS devices, and distributed networking. The paper points out that developing piezoelectric generators is challenging because of their poor source characteristics (high voltage, low current, high impedance) and relatively low power output.

The article "Energy Scavenging for Mobile and Wireless Electronics"; by Joseph A. Paradiso and Thad Starner; Published by the IEEE CS and IEEE ComSoc, 1536-1268/05/; reviews the field of energy harvesting for powering ubiquitously deployed sensor networks and mobile electronics and describers systems that can scavenge power from human activity or derive limited energy from ambient heat, light, radio, or vibrations.

In the review paper "A Review of Power Harvesting from Vibration using Piezoelectric Materials"; by Henry A. Sodano, Daniel J. Inman and Gyuhae Park; published in The Shock and Vibration Digest, Vol. 36, No. 3, May 2004 197-205, Sage Publications; discuses the process of acquiring the energy surrounding a system and converting it into usable electrical energy—termed power harvesting. The paper discuss the research that has been performed in the area of power harvesting and the future goals that must be achieved for power harvesting systems to find their way into everyday use Patent application WO07038157A2; titled "Energy Harvesting Using Frequency Rectification"; to Carrnan Gregory P. and Lee Dong G.; filed: Sep. 21, 2006 discloses an energy harvesting apparatus for use in electrical system, having inverse frequency rectifier structured to receive mechanical energy at frequency, where force causes transducer to be subjected to another frequency.

SUMMARY OF THE INVENTION

The present invention relates to an apparatus system and method for power harvesting on roads and highways using piezoelectric generator.

One aspect of the invention is to provide a system for power harvesting comprising: a plurality of piezoelectric devices configured to produce electrical power when a vehicle traverses their locations; a power conditioning unit; and electrical conductors connecting said piezoelectric to said power conditioning unit.

In some embodiments, the piezoelectric devices are embedded in a road.

In some embodiments, the power conditioning unit is further connected to the main power grid.

In some embodiments, the power conditioning unit is further connected to a power storage unit.

In some embodiments, the power conditioning unit supplies electrical power to battery charging station for charging batteries of electrical vehicles.

In some embodiments, the power conditioning unit supplies electrical power to roadside lights.

In some embodiments, the power conditioning unit supplies electrical power to a signaling unit.

Another aspect of the invention is to provide a system for power harvesting wherein said piezoelectric devices comprise a plurality of PZT rods embedded in a binder.

In some embodiments said binder is epoxy resin.

In some embodiments said binder can be selected from a group of binders such as thermoplastic polymer, rubber, or other natural or synthetic resilient material.

Another aspect of the invention is to provide a method of harvesting energy comprising: embedding a plurality of piezoelectric devices capable of producing electrical power in a road; connecting power conditioning unit to said plurality of piezoelectric devices by electrical conductors; wherein electrical power is generated when a vehicle traverses said piezoelectric devices locations.

In some embodiments said embedding a piezoelectric device-based energy harvesting system comprising: positioning said plurality of piezoelectric devices and said electrical conductors over a concrete base of a road; and pouring asphalt over said piezoelectric devices and said electrical conductors.

In some embodiments said embedding a piezoelectric device-based energy harvesting system comprising: pouring first asphalt layer over road foundation; positioning said plurality of piezoelectric devices and said electrical conductors over first asphalt layer; and pouring a second asphalt layer over said piezoelectric devices and said electrical conductors.

In some embodiments said embedding a piezoelectric device-based energy harvesting system comprising: partially removing an asphalt layer off an already paved road leaving a first asphalt layer; positioning said plurality of piezoelectric devices and said electrical conductors over said first asphalt layer; and pouring a second asphalt layer over said piezoelectric devices and said electrical conductors.

In some embodiments said embedding a piezoelectric device-based energy harvesting system comprising: removing an asphalt layer off an already paved road along a narrow trench parallel to the long dimension of said road; positioning said plurality of piezoelectric devices and said electrical conductors in said trench; and pouring asphalt over said piezoelectric devices and said electrical conductors thus filling said trench.

In some embodiments said removing an asphalt layer off an already paved road along a narrow trench parallel to the long dimension of said road comprises creating a trench reaching a concrete foundation of said road.

In some embodiments said removing an asphalt layer off an already paved road along a narrow trench parallel to the long dimension of said road comprises creating two narrow trenches parallel to the long dimension of said road per each lane of said road.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 11(a-d) schematically depict the method of implementation of energy harvesting system in an existing road having a concrete foundation according to an embodiment of the current invention in different stages of the retrofitting process.

DESCRIPTION OF THE PREFERRED EMBODIMENTS

Figure 1A:
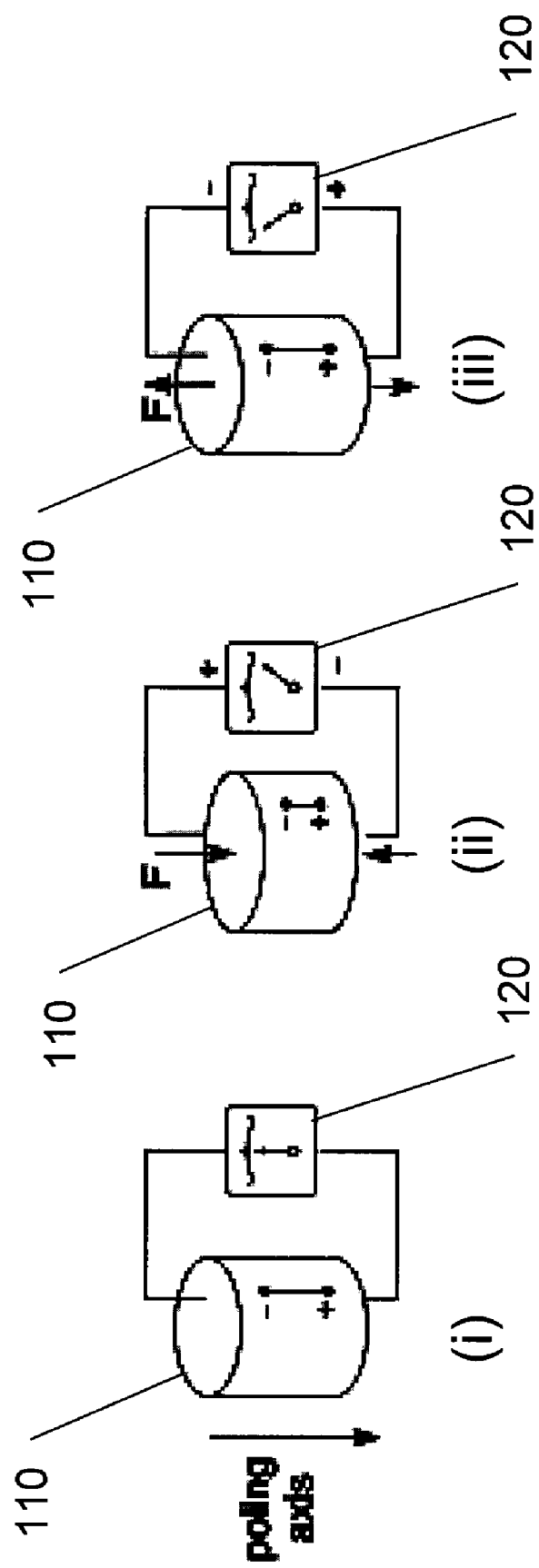
FIG. 1. Schematically depicts the generator actions of a piezoelectric element as known in the art.

The present invention relates to an apparatus system and method for power harvesting on roads and highways using piezoelectric generator.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The drawings are generally not to scale. Some optional parts were drawn using dashed lines.

For clarity, non-essential elements were omitted from some of the drawings.

As used herein, an element or step recited in the singular and proceeded with the word "a" or "an" should be understood as not excluding plural elements or steps, unless such exclusion is explicitly recited.

Figure 1B:
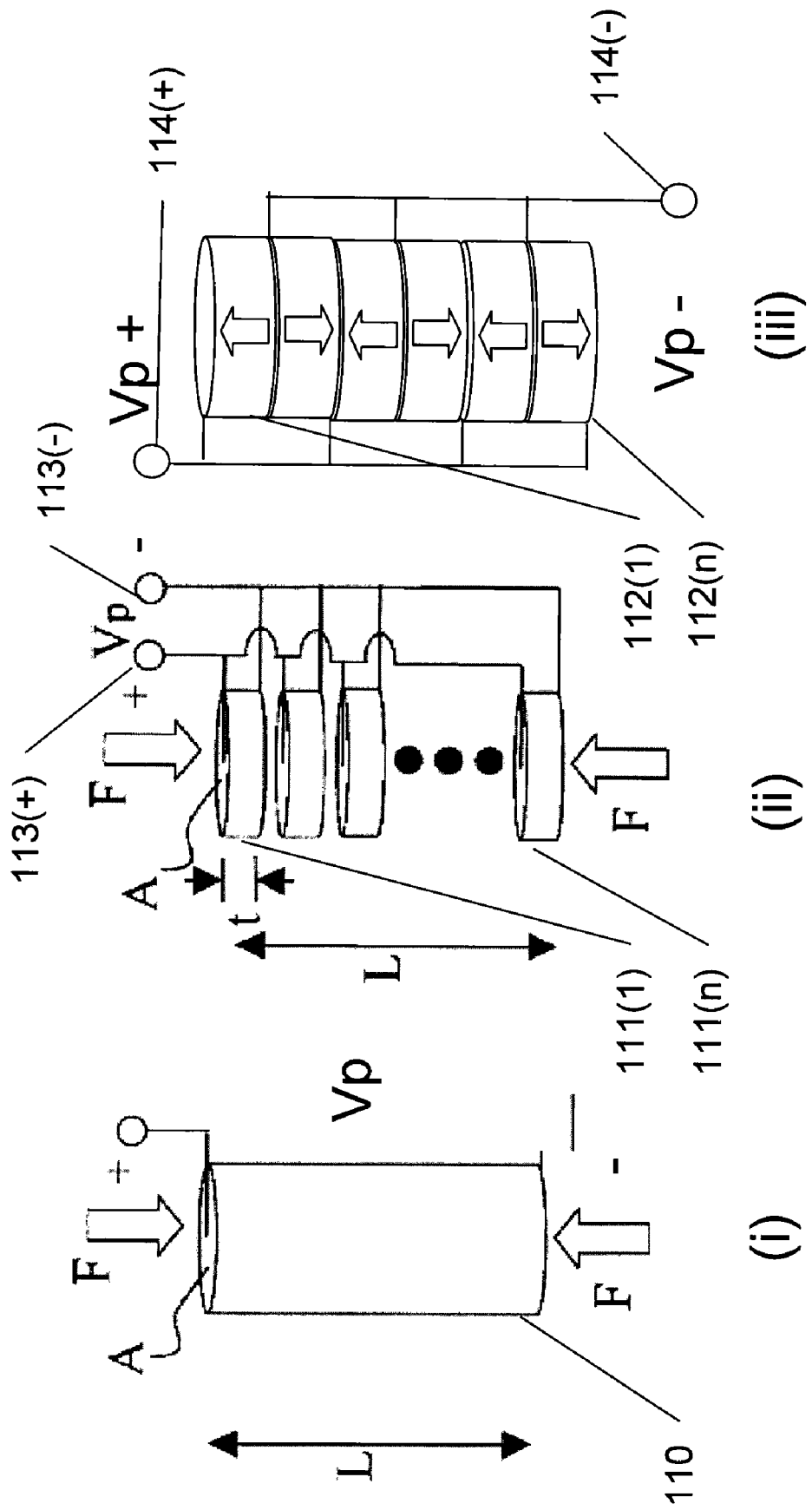

FIG. 1a-b schematically depicts the generator actions of a piezoelectric element as known in the art and as discussed in the background section.

FIG. 1a(i) depicts a PZT disk 110, showing its polling direction in the absence of external force. In this case, voltmeter 120 show no generated charge.

FIGS. 1a(ii) and 1a(ii) show the same PZT disk 110 with compression and extension forces applied to it respectively. In this case, voltmeter 120 shows positive and negative generated charge respectively.

FIG. 1b(i) depicts a single element PZT similar to the one depicted in FIG. 1a. The length "L" of the element and its surface area "A" are marked in this figure.

FIG. 1b(ii) depicts a multi element PZT stack comprising n PZT disks 111(1) to 11(n), each having substantially the same thickness t and surface area "A". In this case all the PZT disks 111(1) to 111(n) are polled in the same direction, and all are electrically connected in parallel. Electrical insulator need to be inserted between contact electrodes of adjacent elements.

Charge output appears at the connectors 113(+) and 113 (−). For convenience, we may refer to these connectors as "top electrode" and "bottom electrode" respectively.

FIG. 1b(iii) depicts a multi element PZT stack comprising n PZT disks 112(1) to 112(n), each having substantially the same thickness and surface area. In this case all the PZT disks 111(1) to 11(n) are polled in alternate direction as depicted by the arrows. Common electrodes are preferably used between faces of adjacent elements.

Charge output appears at the connectors 114(+) and 114 (−). For convenience, we may refer to these connectors as "top electrode" and "bottom electrode" respectively.

Piezoelectric Generators

An important application area for PZT is in the conversion of mechanical energy into electrical energy, and this chapter describes the conditions under which PZT should be used to convert the maximum amount of energy.

A PZT cylinder can generate voltages that are high enough to draw a spark across an electrode gap, and such sparks can be used to ignite combustible gases in for instance cigarette lighters or gas stoves.

Figure 2:
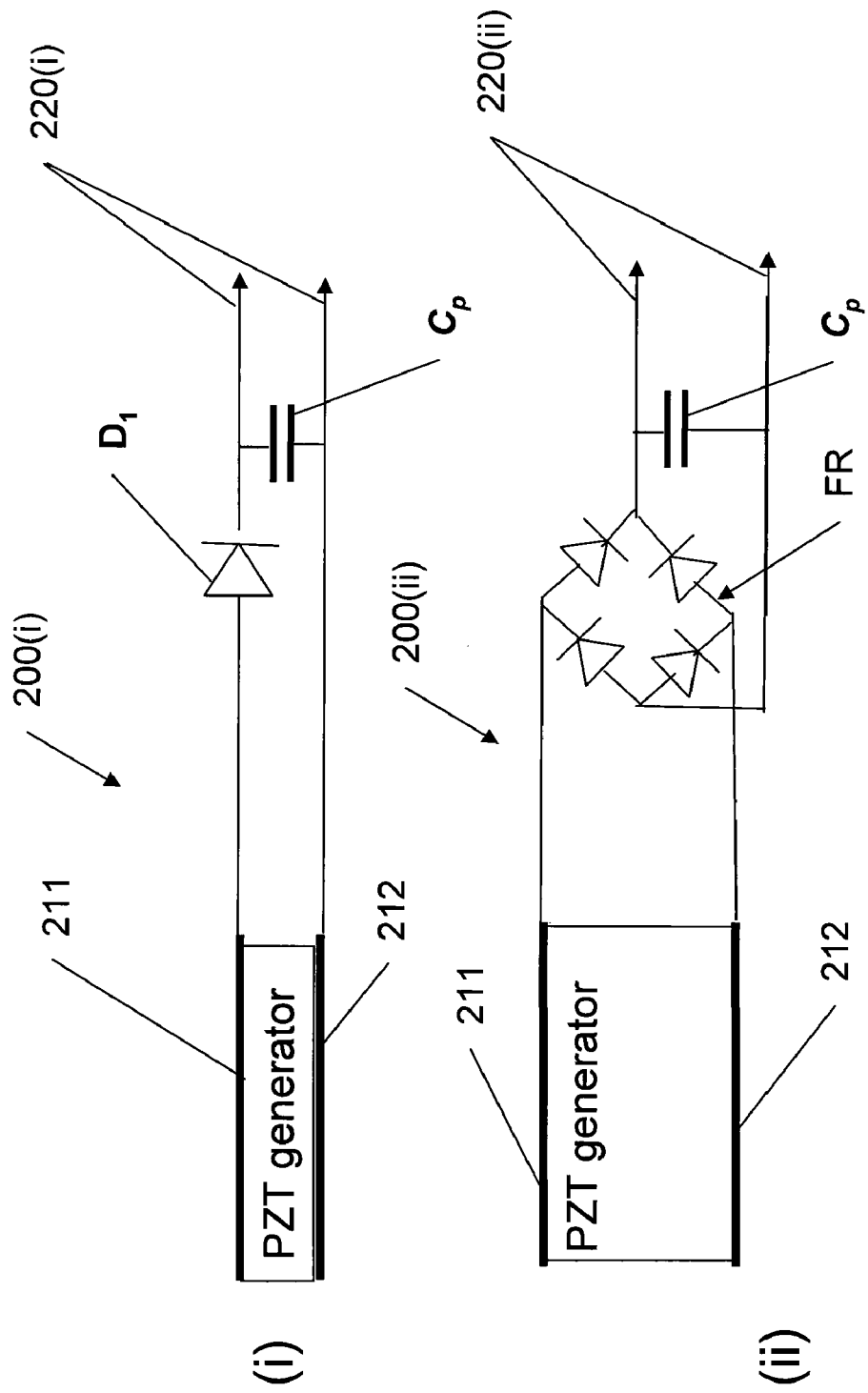
FIG. 2. Schematically depicts an apparatuses for electrical signal generation, rectification and storage FIG. 3 schematically depicts a piezoelectric transducer according to an exemplary embodiment of the invention.

Moreover, a part of the energy generated by a PZT transducer can be stored in a capacitor and can be used to power a circuit as can be seen in FIG. 2.

In the generation and storage apparatuses depicted in FIG. 2, charge generated by the piezoelectric transducer is stored in the energy storage device such a capacitor. The rectifier, schematically depicted by diode D1, holds the collected charge at the capacitor until it is utilized by the energy utilizing load.

FIG. 2(i) depicts a single diode rectifier, while FIG. 2(ii) shows a full rectifier comprising a four diodes bridge.

FIG. 2(i) depicts an energy harvesting system 200(i) using a single diode rectifier D1. Although the PZT transducer in both FIGS. 2(i) and 2(ii) appears as a single element having top electrode 211 and bottom electrode 212, the PZT transducer may be a multi-element structure such as depicted in FIG. 1b(ii) or preferably as depicted in FIG. 1b(iii).

Rectifying diode D1 prevent electrical charge accumulated on capacitor Cρ from returning to the transducer once the load is removed from said transducer. Thus, the charge on capacitor Cρ remains until it is utilized by a load connected to load output 220(i).

FIG. 2(ii) depicts an energy harvesting system 200(ii) using a full rectifier comprising a four diodes bridge FR.

Rectifying bridge FR comprising four diodes directs charge generated by both compression and extension forces applied to the PZT transducer to capacitor Cρ. Rectifying bridge FR prevent electrical charge accumulated on capacitor Cρ from returning to the transducer once the load is removed from said transducer. Thus, the charge on capacitor Cρ remains until it is utilized by a load connected to load output 220(ii), however, it is clear to see that system 200(ii) better utilizes the generated charge and thus has higher energy efficiency.

Figure 3:
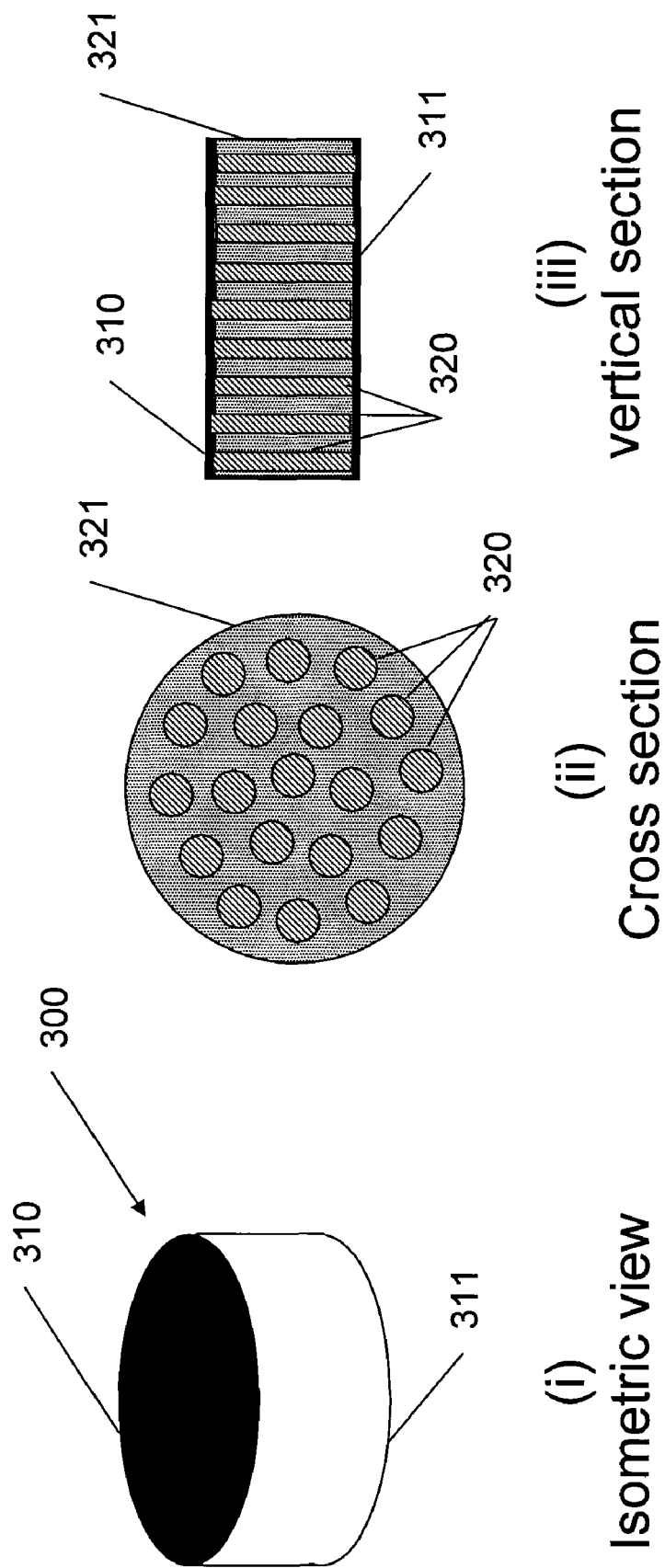

FIG. 3 schematically depicts a piezoelectric transducer according to an exemplary embodiment of the invention.

FIG. 3(i) depicts an isometric view of piezoelectric transducer 300 showing top electrode 310 and bottom electrode 311.

The composite disk made of piezoelectric rods 320 joined by epoxy or other binding resin 321 as schematically depicted in the cross section seen in FIG. 3(ii) and the vertical cross section seen in FIG. 3(iii). For example, binder may be a thermoplastic polymer, rubber or other natural or synthetic resilient material.

Each rod may be made of a single structure plurality of layers as seen in FIGS. 1b(i), 1b(ii) or 1b(iii).

Preferably the electrodes of all the rods are connected n parallel to the top and bottom electrode as depicted in FIG. 3(iii).

It should be clear to the man of the art the circular shape of the transducer and rods, the rods' position and the aspect ratio of the transducer are for demonstration only and actual parameters are to be chosen according to the application taking into accounts requirements such as available space, load, etc.

Figure 4:
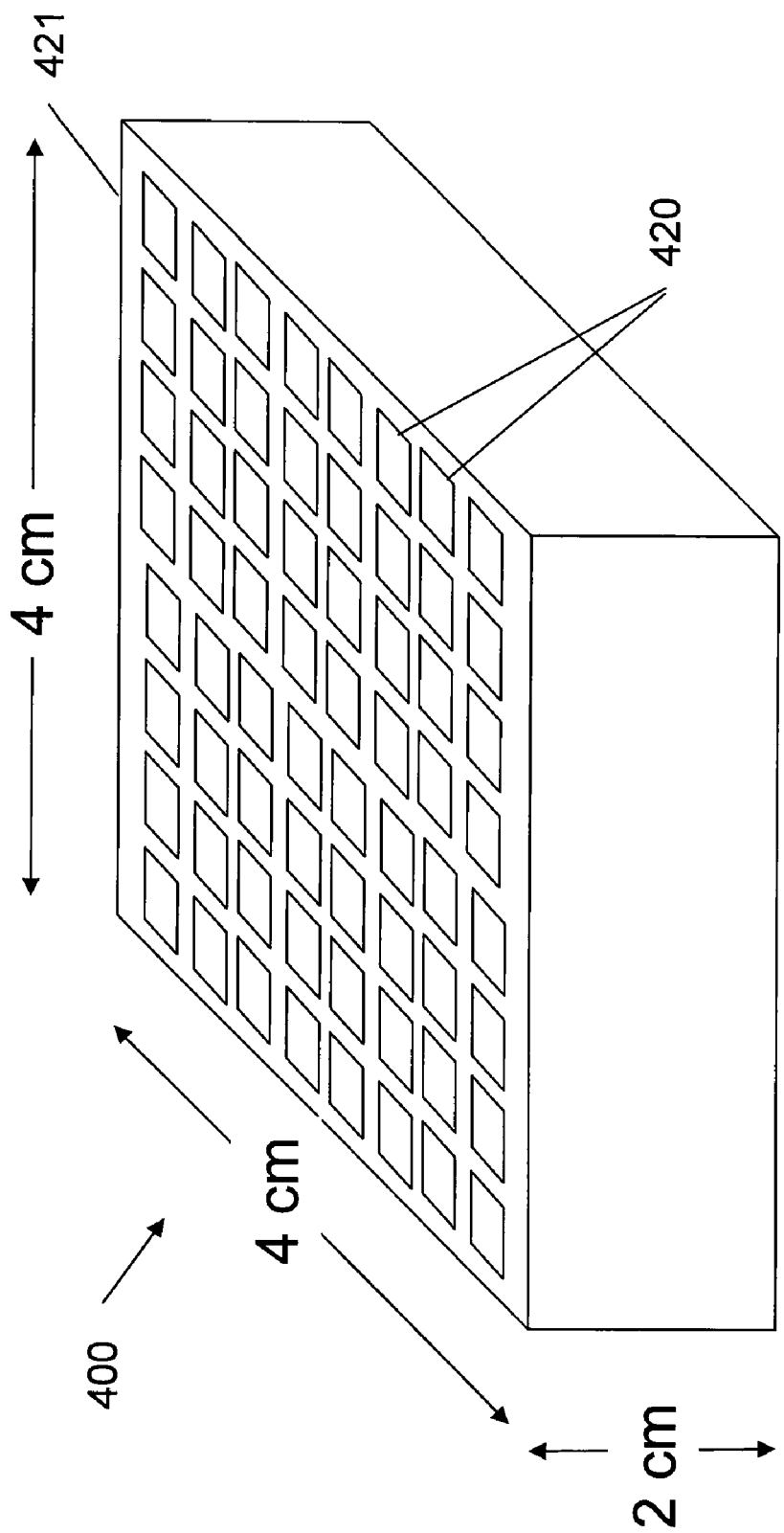
FIG. 4 schematically depicts a box shaped piezoelectric transducer according to a preferred embodiment of the invention.

FIG. 4 schematically depicts a box shaped piezoelectric transducer 400 according to a preferred embodiment of the invention.

The composite box made of piezoelectric rods 420 joined by epoxy or other binding resin 421 as schematically depicted in the figure.

Although the rods are depicted as having square cross section, cylindrical or other shapes may be used.

Typical dimensions of 4×4 cm and 2 cm height are given as example. Other shape and dimensions may be used.

Preferably, the ratio of active piezoelectric material to binder filing is approximately 50%. However, larger or smaller ratio may be used.

Typically, the binder is softer than the piezoelectric material. Each rod may be made of a single structure or plurality of layers.

Each rode may be made of a single structure or plurality of layers.

Preferably the electrodes of all the rods are connected n parallel to the top and bottom electrode (not seen in this figure).

In test apparatus, the ratio of active piezoelectric material to binder filing is approximately 64%. However, larger or smaller ratio may be used. Preferably, the binder ratio is 30% to 40%.

In the test apparatus, an array of 8×8 (total 64) piezoelectric stacks was embedded in the binder, wherein each stack is 4×4 mm and 20 mm high.

Typically, the binder is softer than the piezoelectric material.

Each rod may be made of plurality of layers as known in the art. Preferably, each rod has a multilayer construction as depicted in FIG. 1b(iii). Preferably the electrodes of all the rods are connected n parallel to the top and bottom electrode (not seen in this figure).

In the tested apparatus, each PZT rod is 20 mm high or any other rod's length. Typically, polling voltage is in the order of 50,000 Volts per 1 cm. Using this polling technique would require 100,000 Volts which may lead to sparking and necessitate a very high voltage source. According to the preferred embodiment of the invention, a plurality of rods were connected in parallel and placed in an oven and heated to temperature close to or preferably above the Curie temperature (approximately 300 degrees C. for the ceramic used). Polling voltage of only 5,000 V/cm (total of ~10,000 V) was used. Preferably the rods were cooled to room temperature under the polling voltage. The rods were then integrated into the transducer structure by pouring the binder.

Figure 5:
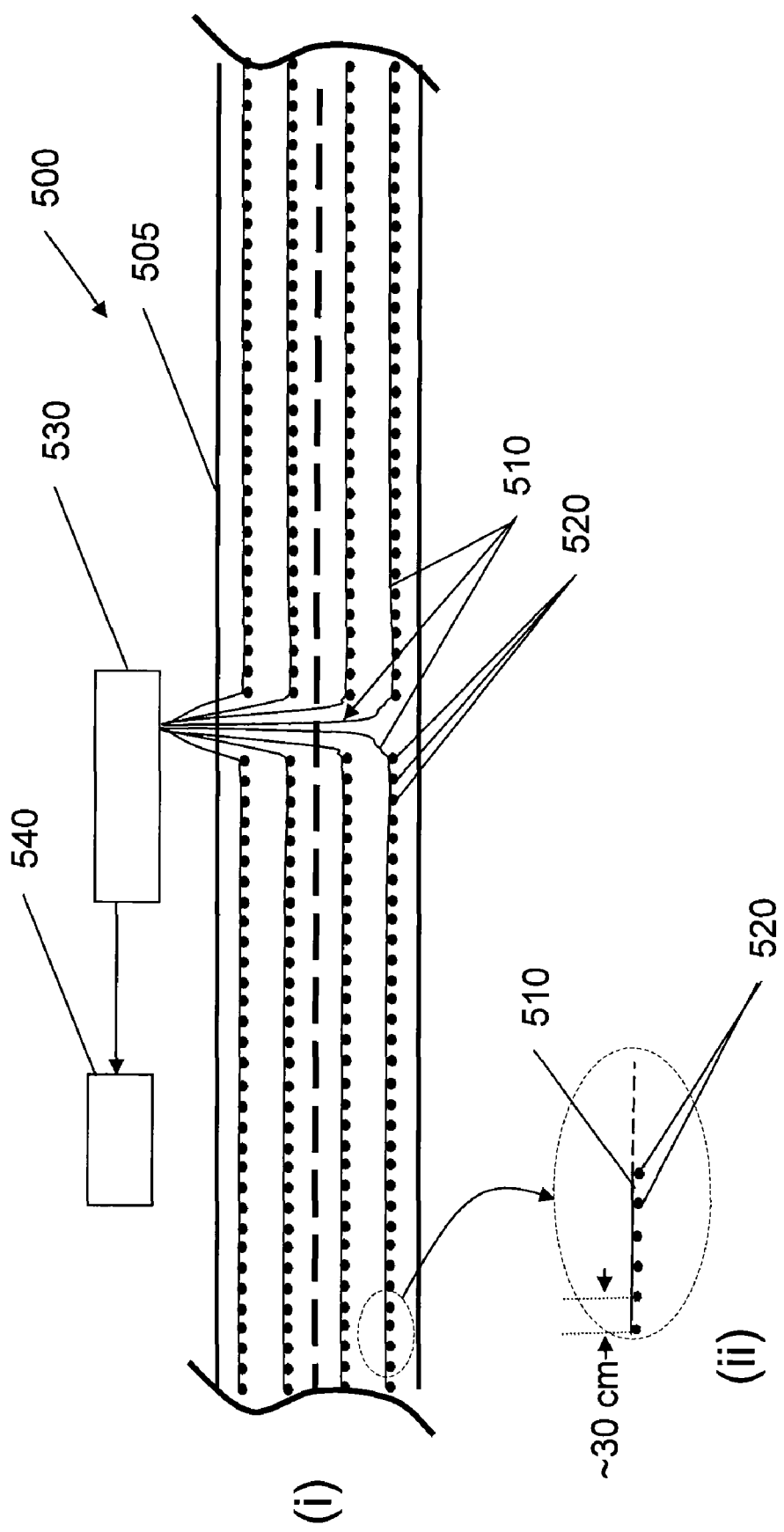
FIG. 5 schematically depicts a view of a system for power harvesting implemented on a roadway according to an exemplary embodiment of the current invention.

FIG. 5 schematically depicts a top view of a system for power harvesting 500 implemented on a two lane roadway 505 according to an exemplary embodiment of the current invention. FIG. 5(ii) schematically depicts a section of road 505.

In the depicted embodiments, a plurality of energy generating devices 520 is embedded in the road. Preferably, the devices 520 are piezoelectric transducer as depicted in FIG. 3 or FIG. 4.

In the preferred embodiment, the energy generating devices 520 are positioned below the road surface at regular intervals. Axial distance of 30 cm may be chosen as depicted in the enlarge section of FIG. 5(ii). It should be noted the distance between energy generating devices 520 is preferably depends on the spread of strain within the road structure and thus depends on road construction and materials. Generally, distance between devices is determined by optimizing payoff from harvested energy and cost of the system which influenced by installation cost and price per piezoelectric device.

Preferably, two rows of transducers are position in each lane of roadway, wherein each row is positioned where wheels of passing cars are likely to traverse. Electrical cables 510 connected to the energy generating devices, are used to transfer the generated energy to the energy management unit 530. Conditioned energy is than transferred to energy utilizing system 540.

In one embodiment, each cable 510 is made of two conductors and all the energy generating devices are connected in parallel. Alternatively, the energy generating devices are connected in series. Combination of parallel and series connection is also possible.

In some embodiments, electric rectification is done at each of the energy generating device, or at a group of energy generating devices and the rectified electric signal is transferred by a cable.

The energy management unit 530 may includes voltage conversion and regulation needed to convert the generated electric signal to useful form.

For example, the energy management unit 530 may comprise of DC to AC converter, converting the rectified generated signal to AC power ready to power devices designed to be powered by the usual household main power grid.

In the preferred embodiment, energy management unit 530 is positioned in the center of, and services a section of road, for example 1 km of road. It should be appreciate that optimization of the distance between energy generating devices and energy management units depends on the cost of cabling, cost of devices, energy loss in the cables, etc.

Preferably, the depicted power harvesting system is duplicated along the road for additional power harvesting.

In some embodiment the rows of energy generating devices are positioned closer to the curb of the road rather than symmetrically about the lane center where care are more likely to travel over it.

In some embodiment the rows of energy generating devices are positioned at average axle width apart from each other.

It should be noted that the example of implementation in a two lane road in this figure is for demonstration and simplicity only. The system may be used in a single or multilane roads.

Figure 6:
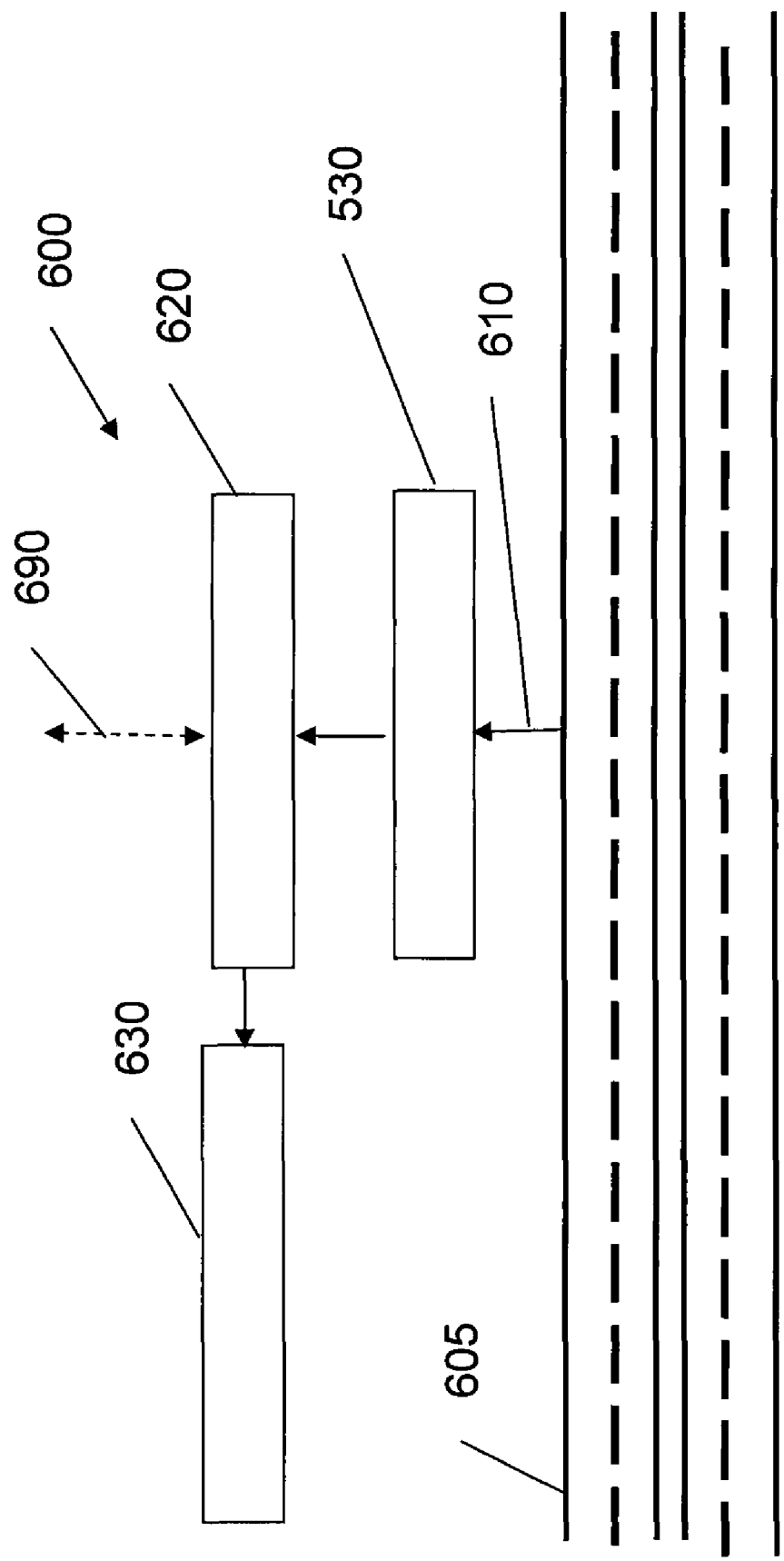
FIG. 6 schematically depicts an implementation of a system for energy harvesting and energy use according to an exemplary embodiment of the invention.

FIG. 6 schematically depicts an implementation of a system 600 for energy harvesting and energy use according to an exemplary embodiment of the invention.

In the depicted embodiment, energy 610 generated by the energy generating devices embedded in the roadway 605 is converted to an electrical power in useful form by the energy management unit 630.

The exemplary embodiment of FIG. 6 depicts a four lane highway having two lanes in each direction, however other types of roads may be used within the scope of the current invention. Generally, cars are more likely to travel in the right lane (Left lane in UK and similar countries) than in the left lane. Thus, it may be cost effective to implant the energy generator in the busiest lanes only. Preferably, one energy management unit 630 serve a section of a road including lanes in both traveling direction as to minimize the energy loss due to cabling electrical resistance.

Optionally, energy storage 620, such as large capacitor, or preferably a rechargeable battery is used for storing the energy to be used when needed. Since the generated energy is present only when cars passes over the energy generating devices, energy storage may be useful so that the power supply is not interrupted when cars are absent or traffic is slow or the number of cars is small.

Energy is utilized by the energy utilization system 630. Optionally energy utilization system 630 is located in proximity to the energy management unit 630 and the optional energy storage 620.

For example:

Energy may be used for lighting the road at night. In this case, energy generated and stored during the day may be used at the following night when car traffic may be too small to provide the full power requirement.

Signaling lights and roadside signs may be powered, specifically, at remote and unpopulated locations and intersection where the cost of providing power using power lines from main power grid may be high. Other uses may be to power emergency communication units; mobile communication base stations and roadside advertisements.

As electric cars become popular, there is a growing need for roadside battery recharging stations. Power harvested from passing cars may be used.

In some embodiments, all the generated power, or extra power left over after local power demand was met, is exported to the main electrical power grid for a fee paid by electric company. In these embodiments, energy management unit may convert the generated electrical power to high voltage used in the high tension power lines. In these embodiments, the optional main grid connection 690 may be used as backup power source to be used locally when traffic is thin.

Figure 7:
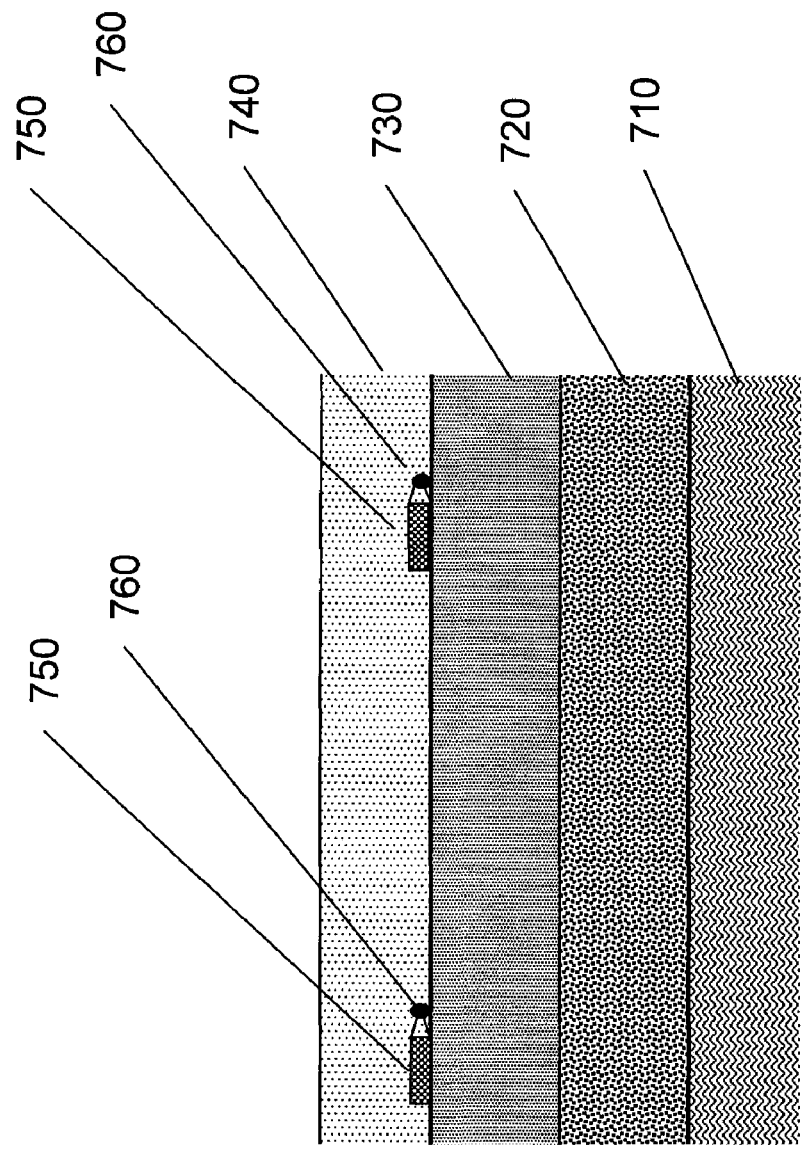
FIG. 7 schematically depicts the implementation of energy harvesting system in a new road having a concrete foundation during road paving according to a preferred embodiment of the current invention.

FIG. 7 schematically depicts the implementation of energy harvesting system in a new road having a concrete foundation during road paving according to a preferred embodiment of the current invention.

In this embodiment, after the gravel layer 720 was deposited over soil 710, and concrete foundation 730 has been prepared, the rows of energy generation devices 750 and their connecting cable 760 are laid on the concrete and the layer of asphalt 740 is paved over it.

This implementation is the simplest and requires only minimal departure from normal road paving practices. In these embodiments there is almost absolute freedom as to the configuration of the connecting cables and their direction.

Figure 8:
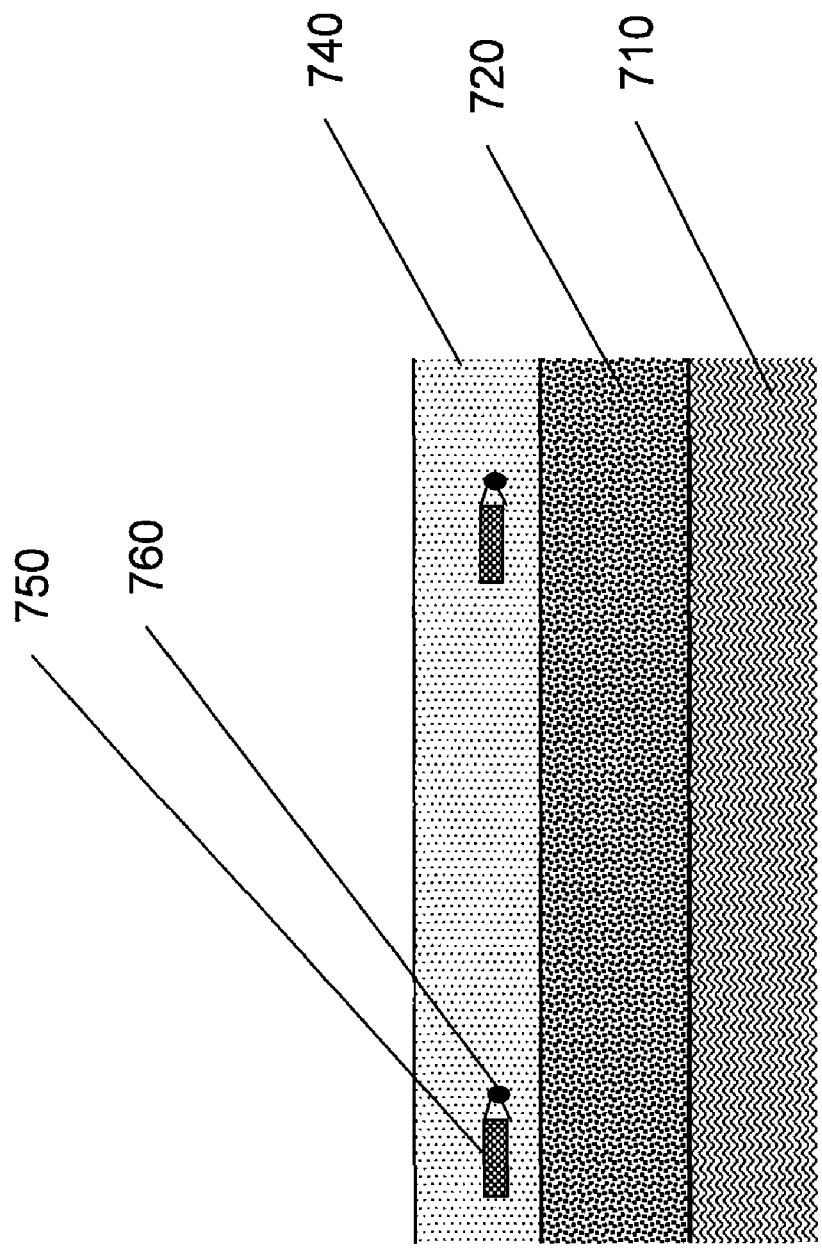
FIG. 8 schematically depicts the implementation of energy harvesting system in a new road not having a concrete foundation during road paving according to a preferred embodiment of the current invention.

FIG. 8 schematically depicts the implementation of energy harvesting system in a new road not having a concrete foundation during road paving according to a preferred embodiment of the current invention.

In this embodiment, the energy generating devises and the connecting cables are embedded in the asphalt.

Figure 9:
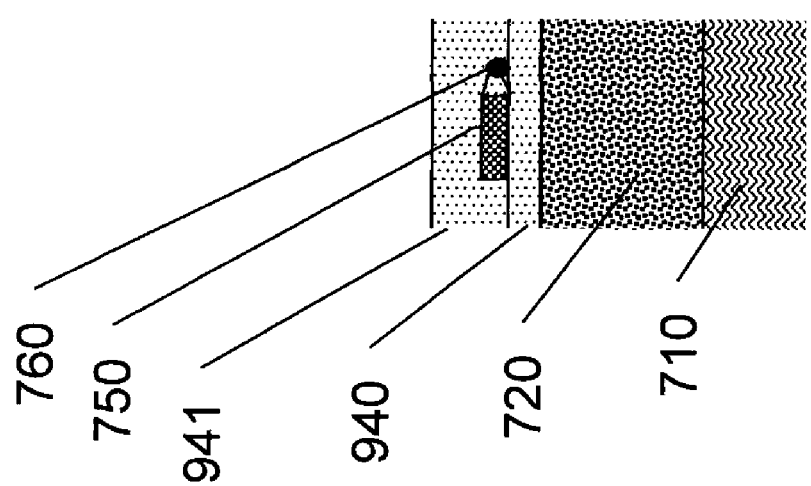
FIG. 9 schematically depicts the method of implementation of energy harvesting system in a new road not having a concrete foundation during road paving according to a preferred embodiment of the current invention FIG. 10(a-d) schematically depict the method of implementation of energy harvesting system in an existing road having a concrete foundation according to an embodiment of the current invention, in different stages of the retrofitting process.

FIG. 9 schematically depicts the method of implementation of energy harvesting system in a new road not having a concrete foundation during road paving according to a preferred embodiment of the current invention.

In this embodiment, after the gravel foundation 720 has been prepared, a firs layer 940 of asphalt is paved. The rows of energy generation devices 750 and their connecting cables 760 are laid on the first layer of asphalt 940 and a second layer 941 of asphalt is paved over it.

This implementation is the simple and requires only paving the asphalt in two layers instead of one. In this embodiments there is almost absolute freedom as to the configuration of the connecting cables and their direction.

FIGS. 10a-d schematically depict the method of implementation of energy harvesting system in an existing road not having a concrete foundation according to an embodiment of the current invention.

In this embodiment, trenches 1010 are cut along the road, for example using a circular disk. Each trench is deep enough to partially penetrate the layer of asphalt 740. The trench is wide enough to accommodate the energy generating device 750 and its connecting cable 760. The row of energy generation devices and their connecting wires are laid on the bottom of the trench and the trench is than refilled with asphalt refill 1020.

FIG. 10(a) to FIG. 10(d) depict the stages of the retrofitting process.

FIGS. 11a-d schematically depict the method of implementation of energy harvesting system in an existing road having a concrete foundation 730 according to an embodiment of the current invention.

In this embodiment, trenches 1110 are cut along the road, for example using a circular disk. Each trench is deep enough to fully penetrate the layer of asphalt 740 and reach the concrete layer 730. The trench is wide enough to accommodate the energy generating device 750 and its connecting cable 760. The row of energy generation devices and their connecting wires are laid on the bottom of the trench against the concrete and the trench is than refilled with asphalt refill 1120.

FIG. 11(a) to FIG. 11(d) depict the stages of the retrofitting process.

FIG. 11a shows the road before retrofitting.

FIG. 11b depicts the stage of digging a trench in the upper pavement layer.

FIG. 11c shows the stage of placing the energy harvesting devices.

FIG. 11d shows the road after the trench was re-paved.

In the next figures, it is depicted using a composite piezoelectric generator for energy harvesting according to another aspect of the current invention.

Figure 12A:
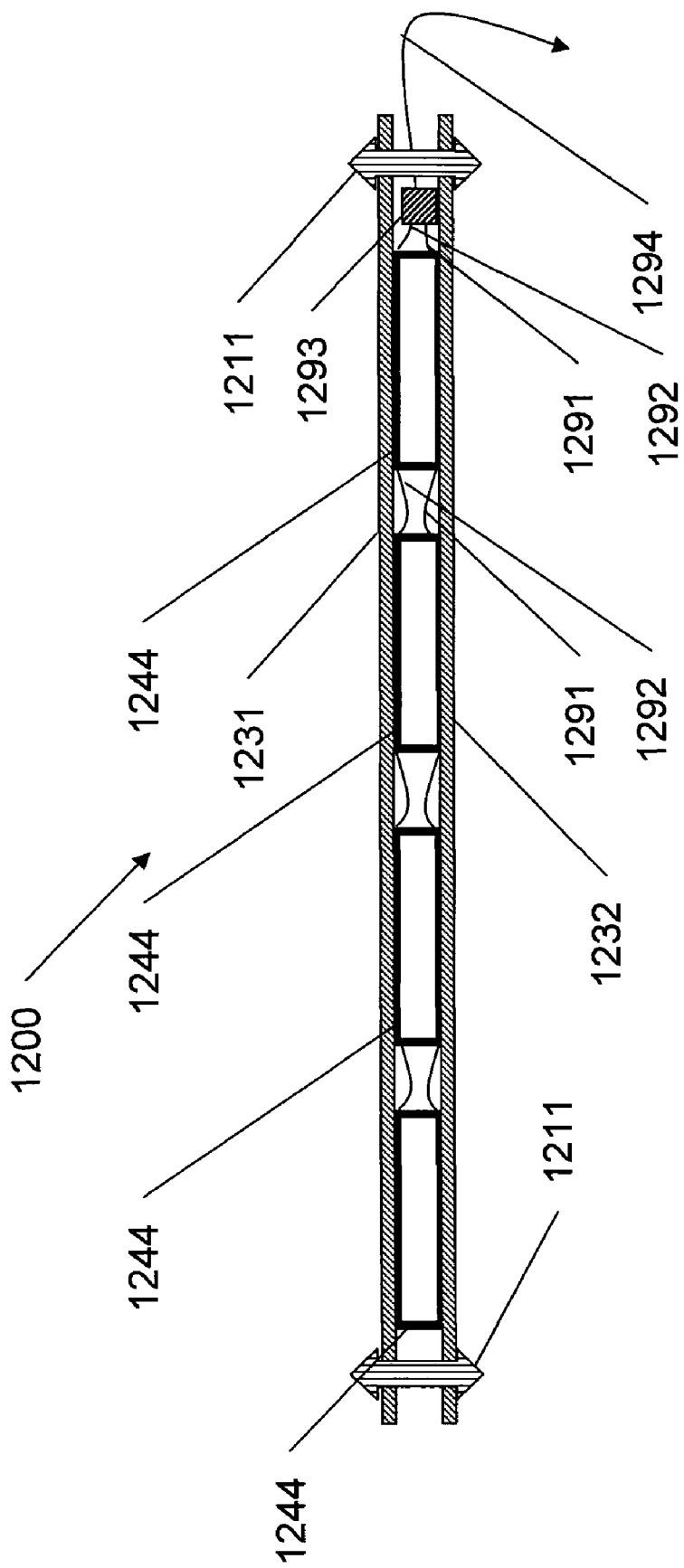
FIG. 12a schematically depicts a side cross sectional view of a composite piezoelectric generator according to another aspect of the current invention.

FIG. 12a schematically depicts a side cross sectional view of a composite piezoelectric generator according to another aspect of the current invention.

According to an exemplary embodiment of the invention, a composite piezoelectric generator 1200 comprises a plurality piezoelectric generators 1244 (four are shown in this figure, but more or less may be used).

For example each of piezoelectric generators 1244 may be a box shaped piezoelectric transducer 400 of FIG. 4, or other shaped piezoelectric generator.

Preferably, piezoelectric generators 1244 are placed on a base plate 1232 and covered with top plate 1231.

Elastic members such as springs 1211, preferably at ends of plate 1231 and 1232 holds the structure together and preferably applies a compression force between base plate 1232 and top plate 1231. This compression force is applied to piezoelectric generators 1244. When a car or a truck passes over or near a composite piezoelectric generator 1200, the pressure and vibration caused by the vehicle propagate in the road and affect base plate 1232 and top plate 1231 creating time varying forces on piezoelectric generators 1244 which generate electrical power. It should be realized that the fact that the structure is "pre-stressed" by Elastic members 1211 ensures that electricity will be generated also in the pulling parts of the vibration cycle. Thus, preferably, the force exerted by Elastic members 1211 is comparable or exceeds the maximum pooling force anticipated during vibration cycle.

Preferably, piezoelectric generators 1244 are electrically connected to each other and to local energy conditioning unit 1293 via electrical conductors 1291 and 1292. However, optionally each of piezoelectric generators 1244 may be connected separately to local energy conditioning unit 1293. Local energy conditioning unit 1293 may be for example in the form disclosed in FIG. 2. Conditioned energy from local energy conditioning unit 1293 is transferred to outside energy utilization via cable 1294. Optionally, local energy conditioning unit 1293 is missing in all or in few of the composite piezoelectric generators 1200 and energy conditioning is performed outside the composite piezoelectric generator.

Preferably, composite piezoelectric generator 1200 is approximately 60 cm long, 4 cm wide and 3 cm high, wherein height includes 2 cm of active piezoelectric material and the thickness of the base plate 1232 and top plate 1231. However, other dimensions may be used Optionally, the entire composite piezoelectric generator 1200 is housed in a protective flexible cover for example for protection from dirt and moisture and for example for preventing asphalt from entering the generator during embedding in a road. Additionally or alternatively, composite piezoelectric generator 1200 may be potted with elastic material.

Figure 12B:
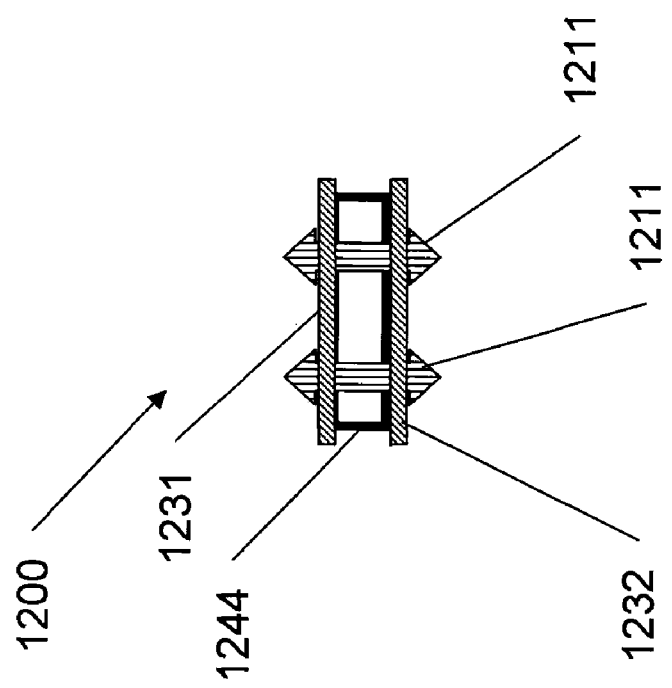
FIG. 12b schematically depicts a side view of a composite piezoelectric generator according to another aspect of the current invention.

FIG. 12b schematically depicts a side view of a composite piezoelectric generator according to another aspect of the current invention.

According to an exemplary embodiment of the invention, a composite piezoelectric generator 1200 comprises a plurality piezoelectric generators 1244.

Preferably, piezoelectric generators 1244 are placed on a base plate 1232 and covered with top plate 1231.

Elastic members such as springs 1211 holds the structure together and preferably applies a compression force between base plate 1232 and top plate 1231 (two are seen in this side view, but one or more than two may be used).

Figure 12C:
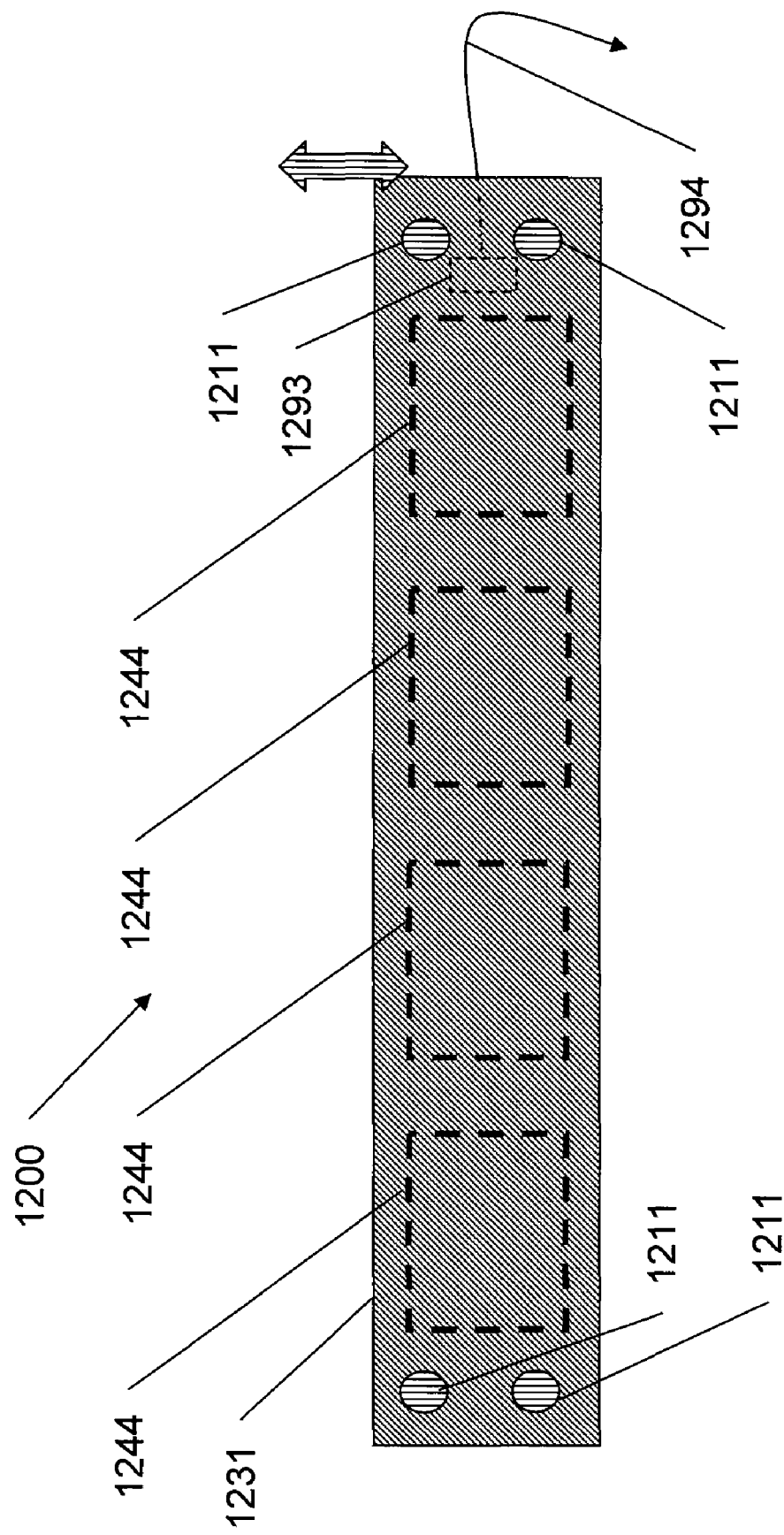
FIG. 12c schematically depicts a top view of a composite piezoelectric generator according to another aspect of the current invention.

FIG. 12c schematically depicts a top view of a composite piezoelectric generator according to another aspect of the current invention.

According to an exemplary embodiment of the invention, a composite piezoelectric generator 1200 comprises plurality piezoelectric generators 1244.

Preferably, piezoelectric generators 1244 are placed on a base plate 1232 and covered with top plate 1231 (only top plate is seen here).

Elastic members such as springs 1211 holds the structure together and preferably applies a compression force between base plate 1232 and top plate 1231 (two elastic members at each side are seen in this top vie, but one or more than two may be used).

Figure 12D:
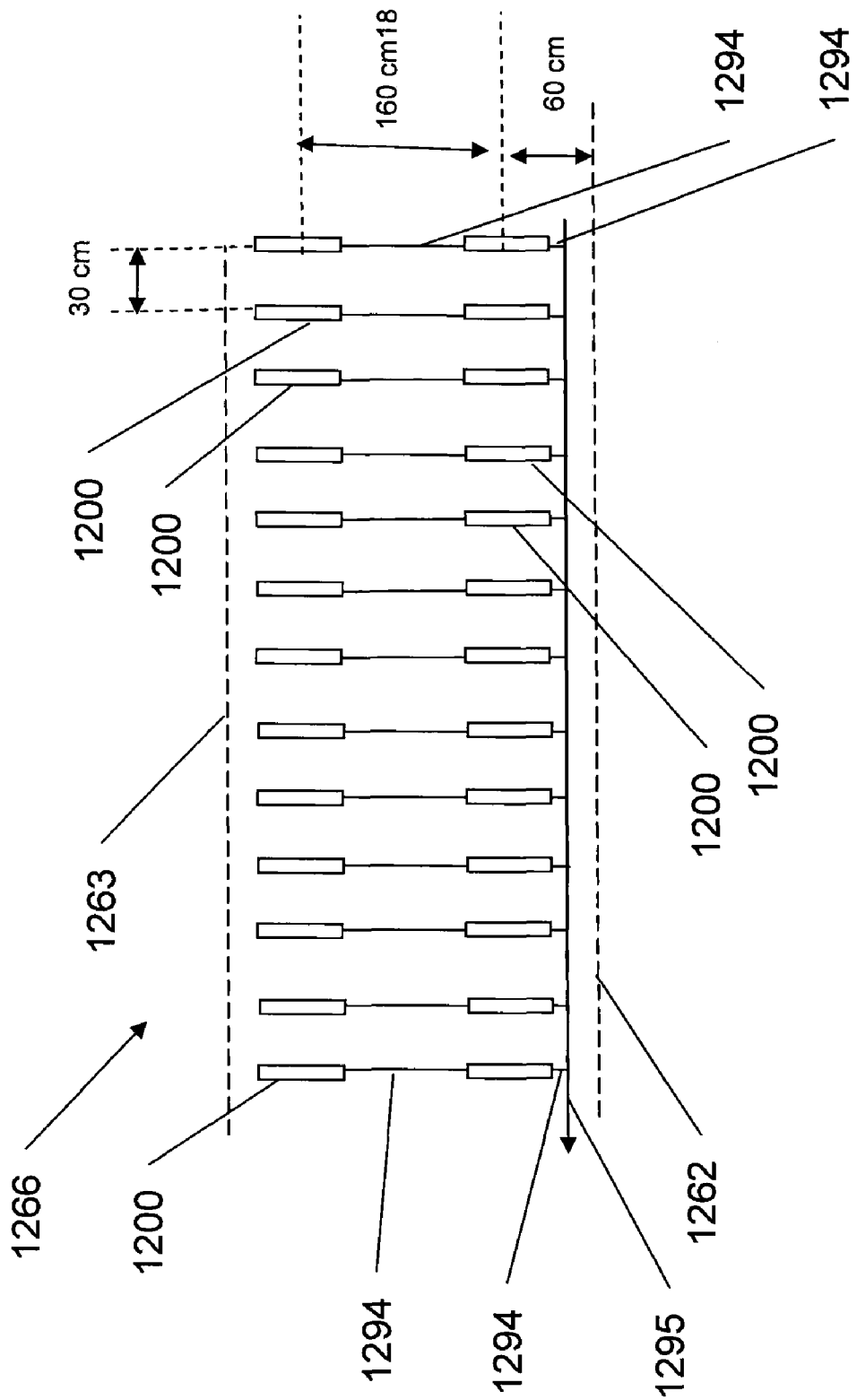
FIG. 12d schematically depicts a system for energy harvesting using composite piezoelectric generators according to an exemplary embodiment of the current invention.

FIG. 12d schematically depicts a system for energy harvesting using composite piezoelectric generators according to an exemplary embodiment of the current invention.

Energy harvesting system 1266 is preferably embedded in a road. In this schematic depiction, one road lane defined by its outer boundary 1262 (which may be the road curb, or the boundary of another lane) and its inner boundary 1263. Energy harvesting system 1266 comprises a plurality of composite piezoelectric generators 1200, preferably arranged in two rows.

According to an exemplary embodiment of the invention, composite piezoelectric generators 1200 are placed so as to maximize the harvested energy. Maximizing the harvested energy may be done by placing the generators 1200 in locations that maximize the probability that wheels of passing vehicle pass over their centers.

In an exemplary embodiment of the invention generators 1200 are placed substantially parallel to each other at approximately 30 cm intervals along the two rows corresponding to the same traffic lane. In an exemplary embodiment of the invention centers of generators 1200 are placed approximately 60 cm from lane's outer boundary 1262. In an exemplary embodiment of the invention centers of generators 1200 of second rows are placed approximately 180 cm from centers of generators 1200 of the first row. It should be noted that other distances among generators 1200 may be used.

Cables 1294 electrically connect generators 1200 to energy utilization system via main cable 1295

Figure 12E:
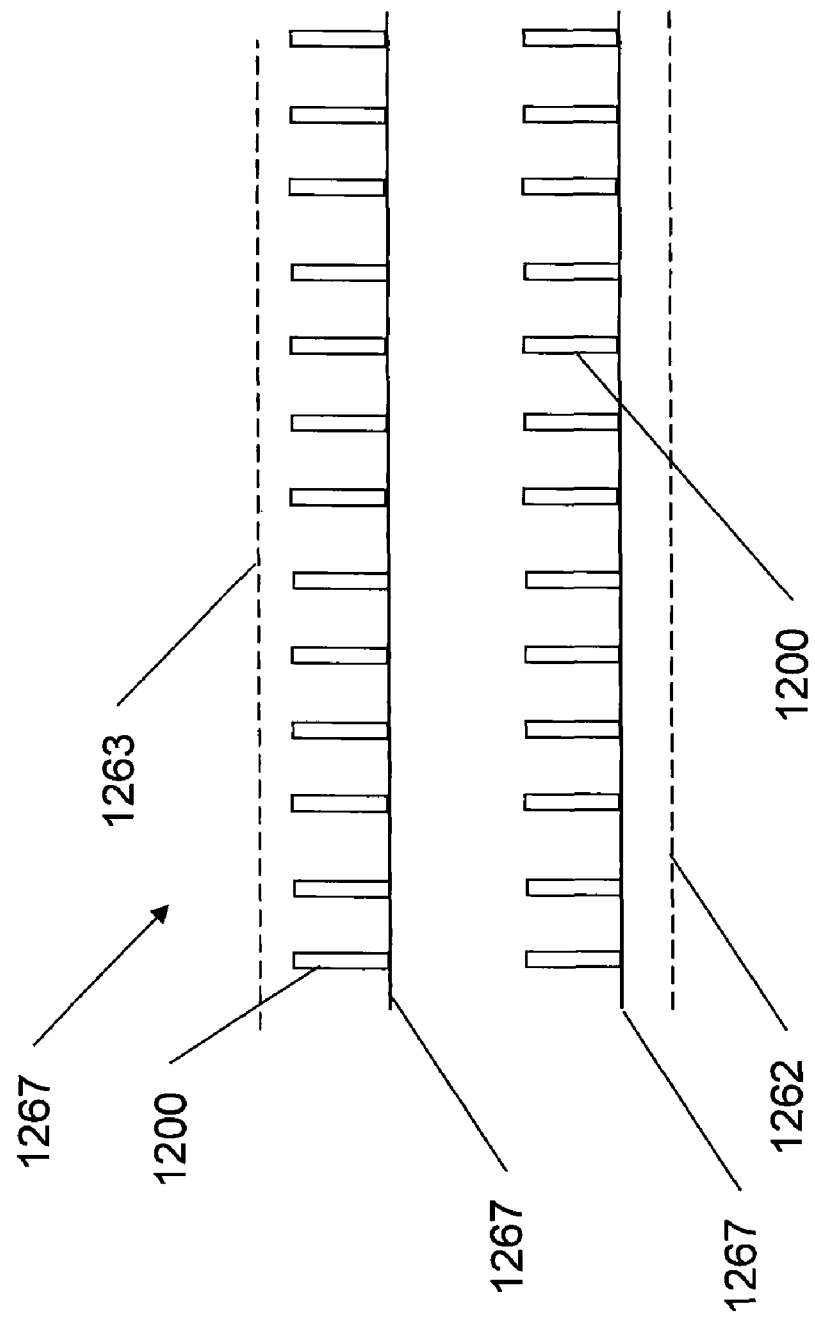
FIG. 12e schematically depicts a system for energy harvesting using composite piezoelectric generators according to an exemplary embodiment of the current invention.

FIG. 12e schematically depicts a system for energy harvesting using composite piezoelectric generators according to an exemplary embodiment of the current invention.

Energy harvesting system 1267 differs from system 1266 by its cabling topology. In this exemplary embodiment, row collecting cables 1267 connects generators 1200 in each row to outside energy utilization system.

It should be realized that other cabling topologies may be used and that the invention is not limited to a one-lane road.

Figure 13:
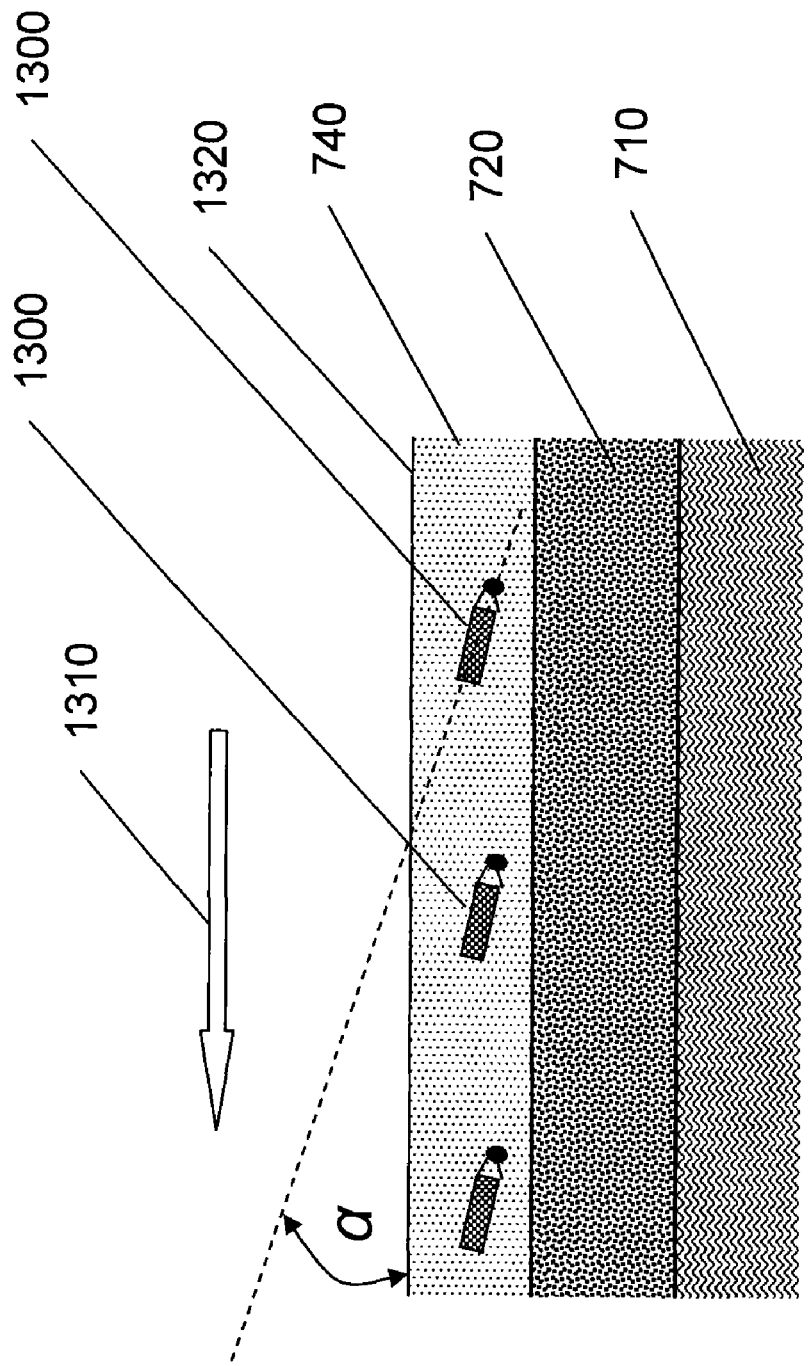
FIG. 13 schematically depicts tilted placement of piezoelectric generator according to another aspect of the current invention.

FIG. 13 schematically depicts tilted placement of piezoelectric generator according to another aspect of the current invention.

According to a general aspect of the current invention, piezoelectric generators 1300 may be embedded in the pavement 740 at an angle α to the surface 1320 of the road.

Preferably, tilt angle is in the direction 1310 of the prevailing moving vehicle over the generators 1300.

Generators 1300 may be selected from any type of piezoelectric generator. Preferably, piezoelectric generators 1300 are composite piezoelectric generators as seen in FIG. 12.

In another preferred embodiment, the energy generating devices are positioned under an airfield runway tarmac. Although airport traffic is less frequent, the stress cased by a airliner landing is much larger than that of a car. Preferably, the energy harvesting system is positioned at the landing section of the field where the stress is at its peak.

In another preferred embodiment, the energy generating devices are positioned under train railway tracks. Although train traffic is less frequent, the stress cased by a train is much larger than that of a car. Additionally, the stress cased by a passing train is concentrated under the rails and may be easier to harvest.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An apparatus for power harvesting from a road on which vehicles pass comprising:
    a base plate;
    a top plate;
    at least one piezoelectric device having a plurality of piezoelectric rods embedded in a matrix placed between said top plate and bottom plate wherein said at least one piezoelectric device is capable of producing electrical power;
    an elastic member connecting said base plate and said top plate capable of exerting compression force on said at least one piezoelectric device;
    a power conditioning unit; and
    electrical conductors connecting said at least one piezoelectric device to said power conditioning unit.

2. The apparatus for power harvesting of claim 1, wherein said at least one piezoelectric device comprise a plurality of piezoelectric rods embedded in a matrix.

3. The apparatus for power harvesting of claim 2, wherein said matrix comprises a binder.

4. The apparatus for power harvesting of claim 3, wherein said binder is an epoxy resin.

5. The apparatus for power harvesting of claim 3, wherein said binder can be selected from a group of binders such as thermoplastic polymer, rubber, natural resilient material, and synthetic resilient material.

6. The apparatus for power harvesting of claim 4, wherein said binder comprises at least 50% of said at least one piezoelectric device.

7. The apparatus for power harvesting of claim 1, wherein said at least one piezoelectric device comprises a plurality of piezoelectric rods positioned within said piezoelectric devices such that the passing vehicle produces compression stress in said plurality of piezoelectric rods.

8. The apparatus for power harvesting of claim 6, wherein said plurality of piezoelectric rods are positioned within said at least one piezoelectric device such that the passing vehicle produces compression stress along a longitudinal axis of said plurality of piezoelectric rods.

9. The apparatus for power harvesting of claim 8, wherein each of said plurality of piezoelectric rods comprises a multilayer piezoelectric stack.

10. A system for power harvesting from a road having a surface and at least one lane comprising:
    a plurality of piezoelectric apparatii capable of producing electrical power in response to compressive strain;
    a power conditioning unit;
    electrical conductors connecting said plurality of piezoelectric apparatii to said power conditioning units,
    wherein said plurality of piezoelectric apparatii are embedded below the surface in two rows along at least one lane where wheels of traveling vehicles are most probable to pass, and
    wherein at least one of said plurality of piezoelectric apparatii comprises:
        a base plate;
        a top plate;
        at least one piezoelectric device placed between said top plate and said bottom plate wherein said at least one piezoelectric device is capable of producing electrical power; and an elastic member connecting said base plate and said top plate and exerting compression force on said plurality of piezoelectric devices.

11. The system for power harvesting of claim 10, wherein the power conditioning unit supplies electrical power to battery charging station for charging batteries of electrical vehicles.

12. The system for power harvesting of claim 10, wherein the power conditioning unit supplies electrical power to roadside lights.

13. The system for power harvesting of claim 10, wherein the power conditioning unit supplies electrical power to a traffic signaling unit.

14. The system for power harvesting of claim 10, wherein the power conditioning unit is further connected to a main power grid.

15. The system for power harvesting of claim 10, wherein said plurality of piezoelectric apparatii comprises a plurality of piezoelectric rods embedded in a matrix.

16. The system for power harvesting of claim 15, wherein said matrix comprises a binder.

17. The system for power harvesting of claim 15, wherein said binder is an epoxy resin.

18. The system for power harvesting of claim 16, wherein said binder can be selected from a group of binders such as thermoplastic polymer, rubber, natural resilient material, and synthetic resilient material.

19. The system for power harvesting of claim 16, wherein said binder is a bitumen-polymeric mix.

* * * * *